Figure 10:
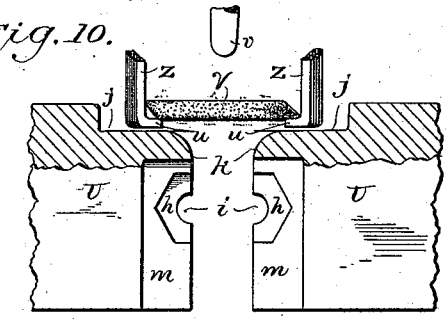

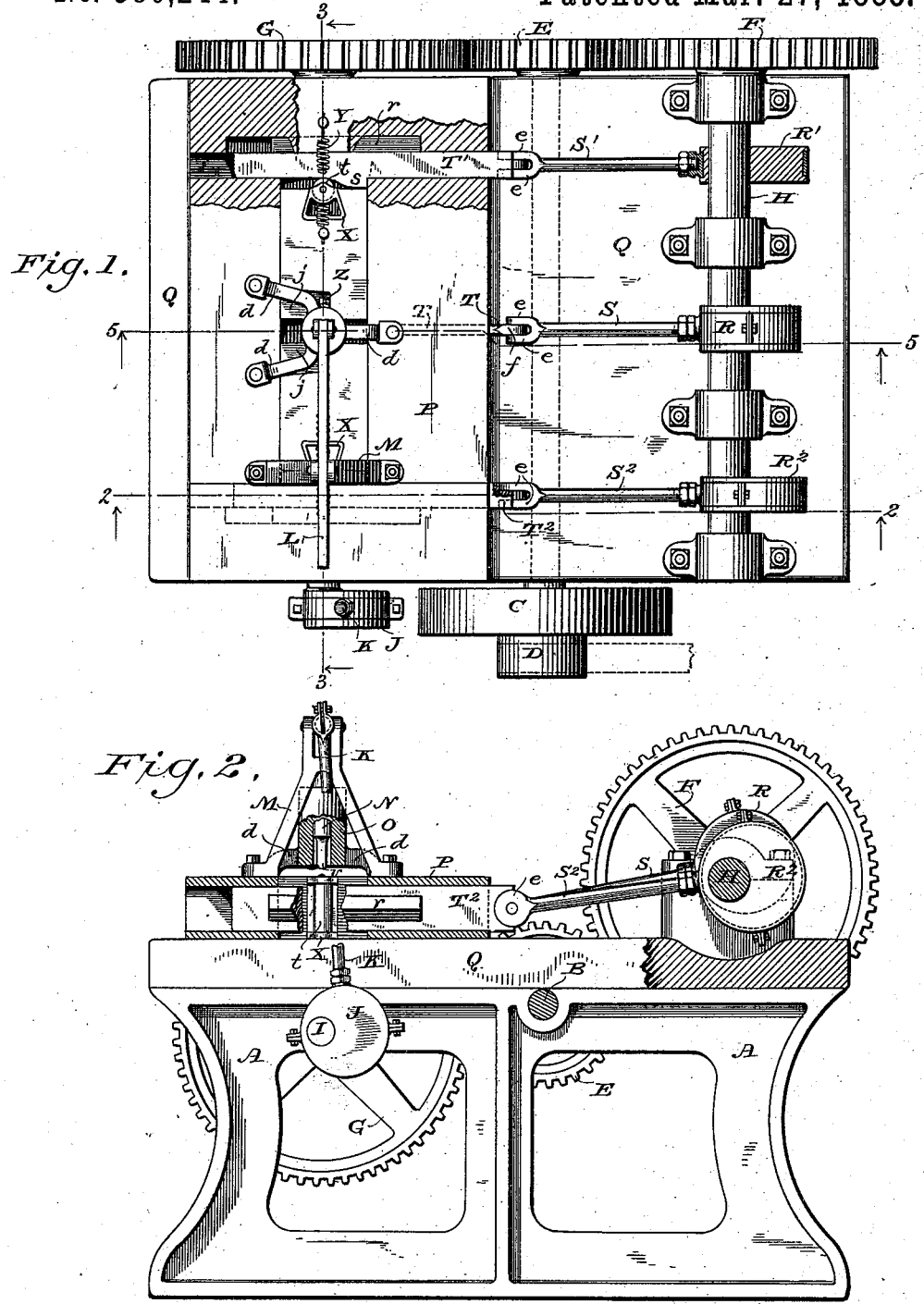

(No Model.) 3 Sheets—Sheet 2.
J. H. BURDICK.
NUT MAKING MACHINE.
No. 380,244. Patented Mar. 27, 1888.
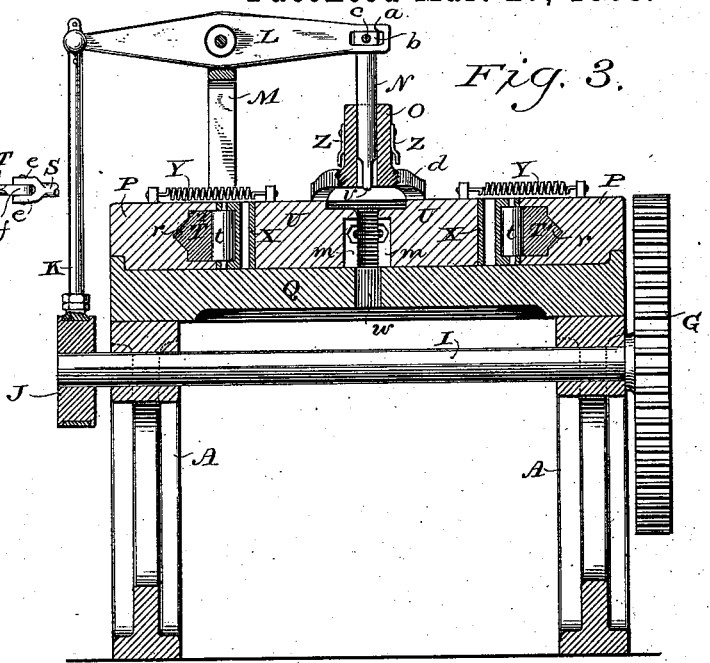
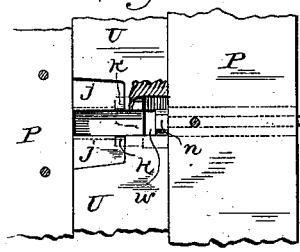
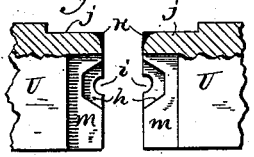
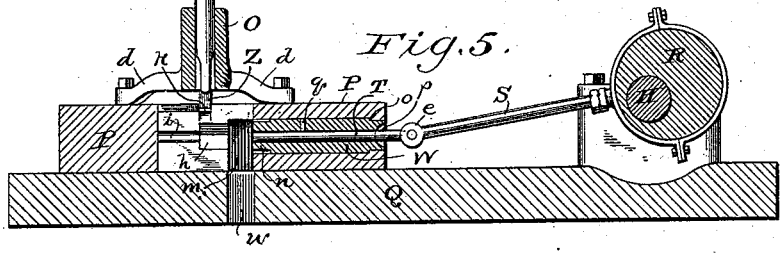
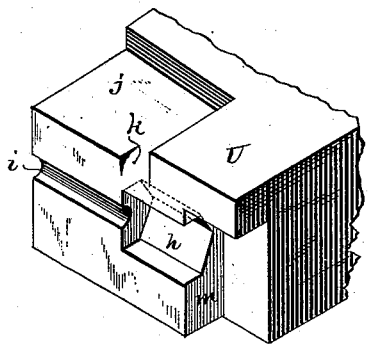
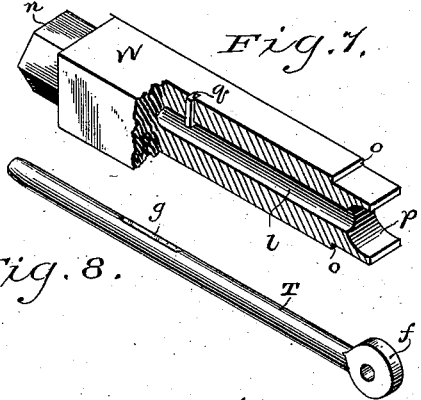
Witnesses.
Geo. W. Young.
N. E. Oliphant.
Inventor.
J. H. Burdick.
By Stout & Underwood
Attorneys
N. PETERS, Photo-Lithographer, Washington, D. C.

(No Model.) 3 Sheets—Sheet 3.

J. H. BURDICK.
NUT MAKING MACHINE.

No. 380,244. Patented Mar. 27, 1888.

Witnesses.
Geo. W. Young
N. E. Oliphant

Inventor.
J. H. Burdick.
By Stout & Underwood
Attorneys.

UNITED STATES PATENT OFFICE.

JUSTIN H. BURDICK, OF UTICA, WISCONSIN.

NUT-MAKING MACHINE.

SPECIFICATION forming part of Letters Patent No. 380,244, dated March 27, 1888.

Application filed December 5, 1887. Serial No. 256,966. (No model.)

*To all whom it may concern:*

Be it known that I, JUSTIN H. BURDICK, of Utica, in the county of Dane, and in the State of Wisconsin, have invented certain new and useful Improvements in Nut-Making Machines; and I do hereby declare that the following is a full, clear, and exact description thereof.

My invention relates to machines for making nuts by the process set forth in my application for patent filed May 31, 1887, Serial No. 239,816, and will be fully described hereinafter.

In the drawings, Figure 1 is a plan view of my machine, partly broken away and sectioned to better illustrate the construction of certain parts. Fig. 2 is a side elevation of the base of my machine with the upper portion in section on the line 2 2 of Fig. 1. Fig. 3 is a transverse vertical section of my machine on the line 3 3 of Fig. 1. Fig. 4 is a detail plan view. Fig. 5 is a longitudinal vertical section on the line 5 5 of Fig. 1. Figs. 6, 7, 8, and 9 are details of one of the die-blocks, plunger and crowner, mandrel, and connecting-rod shown in Fig. 5. Figs. 10 to 16, inclusive, show different stages in the operation of the dies; and Fig. 17 illustrates a different arrangement of the operative faces of the dies.

A designates the base of my machine, of any suitable construction to give the requisite strength and steadiness.

B is the main or driving shaft, journaled in said base and carrying a fly-wheel, C, and driving-pulley D, to which power may be applied, as by the belt shown in dotted lines in Fig. 1, and the opposite end of this shaft has secured thereto a pinion, E, which meshes with the gear-wheels F and G, secured to the ends of the shafts H and I, respectively. The shaft I at the end opposite the gear G is provided with an eccentric, J, from whose strap there extends a connecting-rod, K, whose upper end is connected by universal joint to one end of a walking-beam, L, which is supported by a suitable frame, M, and whose other end is slotted at $a$ for the reception of a sliding block, $b$, to which is pivoted at $c$ the upper end of a bender, N, which has vertical movement above and between the die-blocks (to be hereinafter described) moving in a guide, O, secured by legs $d$ to the block or rectangular frame P, which rests on the bed Q, supported on the base A. The shaft H is supported above the bed Q at the rear end of the machine and fitted with three eccentrics, R R' R², whose straps are jointed to connecting-rods S, S', and S², respectively, whose front ends are rounded, as shown at $e$ $e$, and forked to make elbow-joints with the parts in front of them. The rod S is thus connected to a mandrel, T, having a rounded head, $f$, fitting between the ends $e$ $e$ of the rod S, and a slot, $g$, for a purpose hereinafter described, and the rods S' and S² are connected by rounded bearings, as described, to thrust-bars T' and T².

U U represent the die-blocks, arranged to slide transversely across the bed Q between the inner walls of the hollow rectangular frame or block P. The operative faces of these die-blocks in one arrangement are well shown in Figs. 6, 10, and 13, and in a slightly different arrangement in Fig. 17, in the former views one of the flat faces of the hexagonal die shown being upppermost, and in the latter view one of the points of the same being uppermost. In practice I usually prefer this last-named arrangement, though of course the shape of the die proper may be varied at will, and a square, round, or other die might be employed instead of the hexagon shown.

Figure 16:
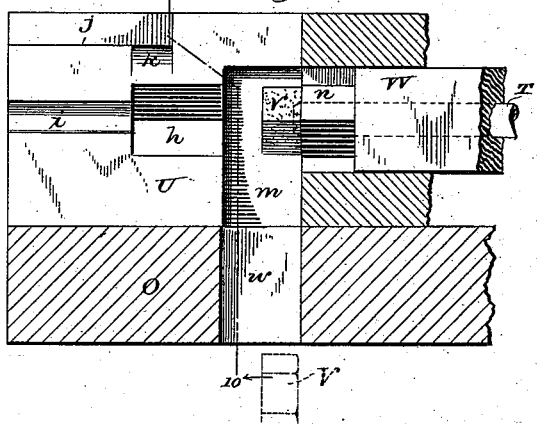

Figs. 10, 11, 12, 14, and 17 are partly in section on the line 10 10 of Fig. 16 of one die-block and a supposed similar line of the companion die-block. (Not shown in Fig. 16.) Each die-block U contains half of the die proper, $h$, from the center of which extends the opening $i$, (half in each die-block,) for the reception of the front end of the mandrel T, and the top of each die-block is cut away or recessed, as at $j$, for the reception of the blank V, from which the nut is to be made, this recess extending a little more than half-way across the die-blocks, as shown in Fig. 6, and at the transverse center of the opposing edges of each die-block a rounded channel, $k$, is cut just above the inner end of the die proper to serve as a guide for the blank and facilitate its downward progress under the bender, as hereinafter described, and each die-block is further cut away from beneath at the rear of each opposing face, as shown at $m$, to afford room for the completed nut to drop out of the way.

W is the plunger, (shown partly in section in Fig. 7,) having a groove, $l$, throughout its length for the passage of the mandrel T therethrough, and at the front end provided with a crowner, $n$, and at the rear end, which is reduced, as shown at $o\ o$, with a rounded concavity, $p$, for the reception of the rounded end $e$ of the connecting-rod S, and this plunger is also fitted with a bolt or pin, $q$, which is driven into the same after the mandrel T is in place within the plunger, so that the lower end of said bolt or pin will project slightly within the slot $g$ in said mandrel.

The thrust-bars T' T², already named, move in transverse grooves cut in or through the frame or block P, there being supplemental V-grooves or guideways for the V-guide strips $r$, integral with or forming part of said thrust-bars, and on the inner side of each bar is a rounded incline or wedge, $s$, bearing against an anti-friction roller, $t$, (vertically pivoted at the end of a safety-piece, X, which is a hollow or skeleton frame inserted in the end of each die-block,) thereby forcing the die-blocks together.

Y Y are retracting-springs connecting the die-blocks to the frame P.

Secured to each side of the guide O are holding-clips Z Z, of flat spring metal, extending down to just above the recesses $j$ in the top of the die-blocks, and the blanks V are inserted at this joint and rest on the feet $u\ u$ of these clips, which are arranged at a slight angle to each other, so that there is somewhat more space between their front than rear edges, and so in entering between them the blank V wedges them apart at the rear, and thereby insures a tight grasp when in position for the foot $v$ of the bender N to descend upon the blank.

Figure 14:
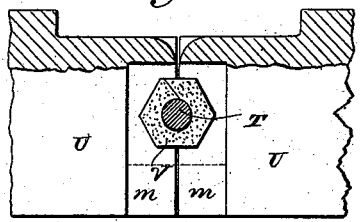
Figure 11:
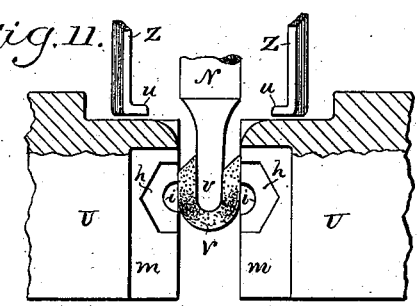
Figure 12:
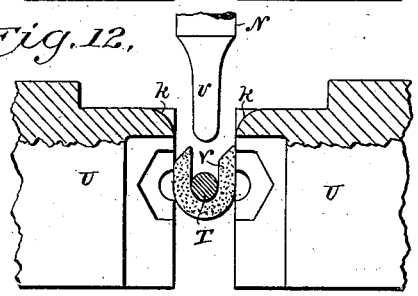
Figure 15:
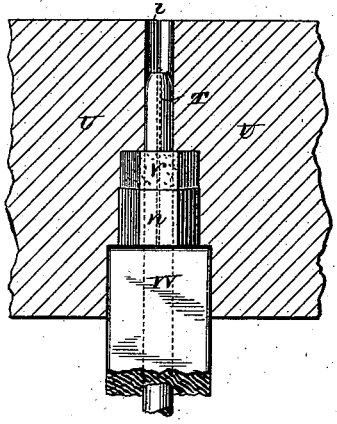
Figure 13:
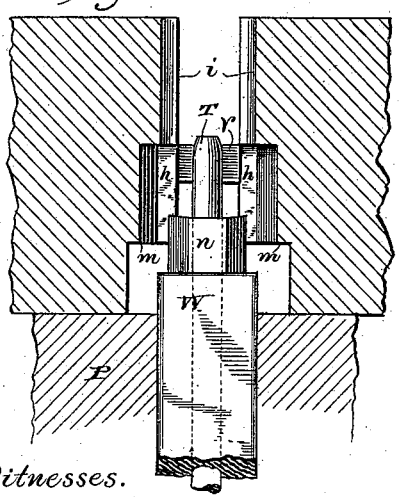

The operation of my machine is as follows: A strip of metal of the shape shown by the blank V in Fig. 10, and at a red heat, is placed in position on the spring-clips Z Z, as just described, and, power being communicated to the machine, the shaft I and its eccentric J revolve and the rod K rises, carrying with it the adjacent end of the walking-beam L and depressing the opposite end of said beam and the bender N, whose foot $v$ strikes the center of the blank V and carries it down between the opposing faces of the die-blocks U U, as shown in Figs. 10 and 11; and then, as the eccentric J on the shaft I continues its revolution, and the bender N consequently begins its upward movement, the eccentrics R' and R² on the shaft H move, (slightly in advance of the central eccentrics, R,) and consequently, by means of the connecting-rods S' and S², the thrust-bars T' and T² are moved forward and serve to begin the movement of the die-blocks U U toward each other just as the extreme end of the mandrel T, actuated by the eccentric R and connecting-rod S, enters between the doubled sides of the blank V, as shown in Figs. 12 and 13. The continued revolution of shaft H and its eccentrics forces the dies close together and carries the rounded end $e$ of the central connecting-rod, S, against the rounded end $p$ of the plunger W, forcing it forward, and then, after the die-blocks have met and the blank V has thereby become a nut, as shown in Fig. 14, there is still a slight subsequent forward motion of the rod S and plunger W, which forces the crowner $n$ on the forward end of said plunger against the nut, Fig. 15, stamping the crown thereon and completing the same. The mandrel T is now drawn back, carrying the nut with it, and thereby drawing the plunger back to place, the rearward motion of the plunger being limited by its shoulders $o$ coming in contact with the similarly-shaped shoulders within the block P, Fig. 5, and as the mandrel is still further retracted the nut is deprived of internal support and drops down through the passage $w$ in the bed Q. Should it happen that the nut should be stripped from the mandrel before the plunger is wholly retracted, the bolt or pin $q$ in said plunger would come in contact with the wall of the slot $g$ in the mandrel, and thus as the mandrel was fully retracted (by the revolution of shaft H and eccentric R) the plunger would be thereby drawn back to place. The die-blocks are moved toward each other by reason of the action of the wedges or inclines $s$ on the thrust-bars T' T² against the anti-friction rollers $t$ of the pieces X, which form practically a part of the die-blocks, and in the event of any obstruction (such as a broken nut, tool, or fragment of metal,) to the perfect closure of the die-blocks the said pieces, being skeleton frames, would crush or break, and thereby save the other parts of the machine from injury, for which reason I term these parts X "safety-pieces." The springs Y Y serve to retract the die-blocks to their original normal position—that is, with their operative faces farthest apart—the moment the thrust-bars are retracted and the inclines $s$ thereon drawn back of the rollers $t$.

The nut made by my machine is what is specifically called in the trade a "blank nut," designed to be subsequently tapped in any ordinary manner.

Having thus fully described my invention, what I claim as new, and desire to secure by Letters Patent, is—

1. In a nut-making machine, the combination of a bender, a pair of die-blocks, and a mandrel, and mechanism for successively moving these parts in the order named toward a common center, substantially as set forth.

2. In a nut-making machine, the combination of a bender, a pair of die-blocks, a mandrel, and a plunger, and mechanism for successively moving these parts in the order named toward a common center, substantially as set forth.

3. In a nut-making machine, the combination of a bender, a pair of die-blocks, a mandrel, and a plunger carrying a crowner, and mechanism for successively moving these parts in the order named toward a common center, substantially as set forth.

4. In a nut-making machine, the combination of a frame, a pair of die-blocks adapted to move within the same, skeleton safety-pieces inserted in the outer ends of the die-blocks and bearing anti-friction rollers, a shaft carrying eccentrics, connecting-rods, thrust-bars jointed to the said rods and bearing inclines adapted for engagement with said rollers, and retracting-springs connecting the said die-blocks with the frame, substantially as set forth.

5. In a nut-making machine, the combination of a frame, a pair of die-blocks adapted to move within the same, a shaft carrying three eccentrics, thrust-bars adapted for engagement with the die-blocks and connected to the outer eccentrics, a mandrel connected to the intermediate eccentric and bearing a plunger, and a bender located above and adapted to reach the common center to which the dies and mandrel are successively moved by the action of the said eccentrics and connections, substantially as set forth.

6. In a nut-making machine, the combination of a frame, a pair of die-blocks adapted to move within the same, a shaft carrying eccentrics at each end, and an intermediate eccentric set out of line with the end eccentrics, connecting-rods and thrust-bars connected to the end eccentrics, a connecting-rod and mandrel connected to the intermediate eccentric, a plunger and crowner carried by a mandrel, and a bender located above and adapted to reach the common center to which the dies and mandrel are successively moved, a shaft having a gear at one end forming part of a train of gears in mesh with the gear of the described eccentric-shaft and bearing an eccentric on its opposite end, a walking-beam connected to the bender at one end, and a connecting-rod jointed to the other end of the walking-beam and to the last-named eccentric, substantially as set forth.

In testimony that I claim the foregoing I have hereunto set my hand, at Milwaukee, in the county of Milwaukee and State of Wisconsin, in the presence of two witnesses.

JUSTIN H. BURDICK.

Witnesses:
H. G. UNDERWOOD,
N. E. OLIPHANT.